(No Model.)

M. G. CALDWELL.
GATE.

No. 464,170. Patented Dec. 1, 1891.

Witnesses—
Wm. Marks Jr.
Chas. G. Brevillier.

Inventor—
Matthew G. Caldwell
by Hallock & Wallack
Atty

United States Patent Office.

MATTHEW G. CALDWELL, OF NORTH EAST, PENNSYLVANIA.

GATE.

SPECIFICATION forming part of Letters Patent No. 464,170, dated December 1, 1891.

Application filed August 18, 1891. Serial No. 402,973. (No model.)

*To all whom it may concern:*

Be it known that I, MATTHEW G. CALDWELL, a citizen of the United States, residing at North East, in the county of Erie and State of Pennsylvania, have invented certain new and useful Improvements in Gates; and I do hereby declare the following to be a full, clear, and exact description of the invention, such as will enable others skilled in the art to which it appertains to make and use the same.

This invention relates to gates; and it consists in certain improvements in the construction thereof, as will be hereinafter fully set forth, and pointed out in the claims.

Figure 1:
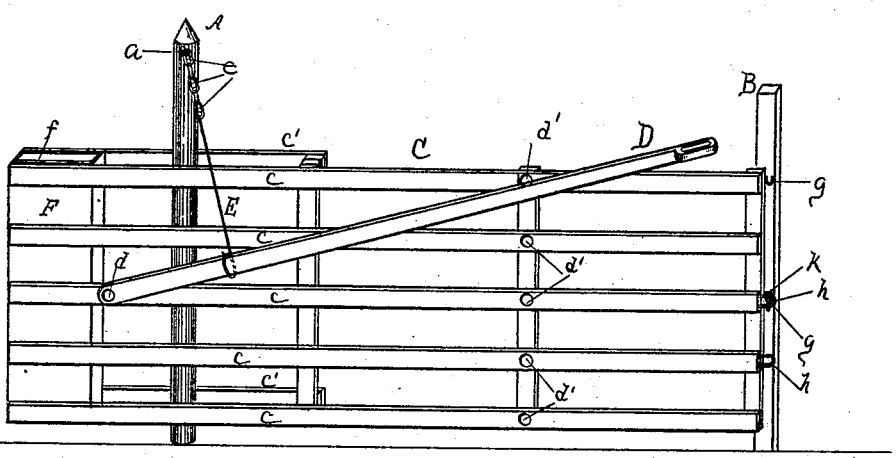
Figure 2:
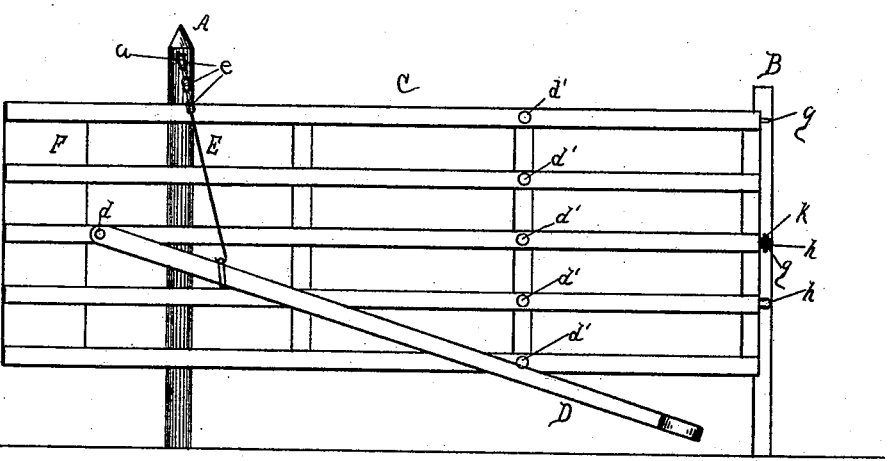

My invention is illustrated in the accompanying drawings, as follows:

Figure 1 is a perspective view of my improved gate. Fig. 2 is a side elevation of the same, showing the gate raised from the ground.

A marks the post on which the gate is hung and on which it moves pivotally.

B marks the post to which the free end of the gate is fastened when closed.

C marks the gate; D, the lever for raising and lowering the gate; E and $e$, the rod and links by which the gate is suspended; F, the counter-weight box; $a$, the pin in the post A, to which the links $e$ engage to support the gate; $c$, the horizontal bars of the gate; $c'$, two horizontal strips parallel with the bars $c$, which are on the opposite side of the post A from the bars $c$; $d$, the pivot of the lever D; $d'$, the pins which engage the free end of the lever D and hold it at different points; $f$, the mouth of the counter-weight box; $g$, the staples in the post B; $h$, the staples on the gate; $k$, the holding-pin.

The construction and operation are as follows: The gate-body is made of horizontal and vertical pieces, as commonly. At the end of the gate nearest the pivot-post is a vertical counter-weight box F, in which can be placed earth or stones to give the necessary weight to counterbalance the part of the gate between the posts A and B. The strips $c'$ are parallel with the strips $c$ of the gate-body, and are far enough removed from the same to admit the post A between them. The lever D is fulcrumed at $d$ near the pivoted end of the gate and extends forward to near the free end of the gate. The suspending rod and links E $e$ connect with the lever D near its fulcrum and with a pin or hook $a$ in the post A, near its top. When the lever D is adjusted as shown in Fig. 1, the gate will have its lower bar $c$ close to the ground; but when adjusted as shown in Fig. 2 it will be considerably raised from the ground, and when adjusted at any of the intermediate points $d'$ it will be raised from the ground more than in Fig. 1 and less than in Fig. 2. The object of the links $e$ in the suspending means E $e$ is to provide for suspending the gate normally more or less from the ground.

The object in having the gate suspended on the adjusting-lever is twofold: first, in case of deep snow the gate can be raised up so as to clear the snow before it is opened by depressing the lever, and, second, the gate can be left raised from the ground a desired distance, so as to afford free passage for small stock—such as hogs or sheep—when closed against large stock.

The gate has a free longitudinal movement, when unfastened, to the extent of the length of the space between the bars $c$ and $c'$. It has a free vertical movement to the extent of the action of the lever D, and it can be swung pivotally on the post A, swinging on its suspending rod and links E $e$.

Any means may be used to fasten the free end of the gate to the post B. I have shown staples $g$ in the post, staples $h$ in the gate, and a pin $k$, the staples $g$ and $h$ being so placed that the one can slip through the other and the pin $k$ pass through the former in front of the latter.

What I claim as new is—

1. In a suspended counterbalanced gate, the combination, with the single pivot-post A, the gate C, the lever D, and suspending means connecting said lever with said post, of the bars $c'$, parallel with the bars $c$ of the gate-body and forming a longitudinal space containing said post.

2. In a suspended counterbalanced gate, the combination, with the gate-body C, of the counter-weight box F, having an opening $f$ to receive the counterweighing matter, and the parallel bars $c'$, forming a longitudinal opening, the post A within said longitudinal opening, the lever D, fulcrumed on said gate-body, and the suspending means E $e$, connecting said lever with said post.

In testimony whereof I affix my signature in presence of two witnesses.

MATTHEW G. CALDWELL.

Witnesses:
JNO. K. HALLOCK,
WM. P. HAYES.